United States Patent

Santos

[11] Patent Number: 5,942,457
[45] Date of Patent: Aug. 24, 1999

[54] PROCESS FOR REGENERATING SPENT CLAY

[76] Inventor: Benjamin Santos, 38735 Huntingdon Circ., Fremont, Calif. 94536

[21] Appl. No.: 08/953,165

[22] Filed: Oct. 17, 1997

[51] Int. Cl.⁶ .............................. B01J 20/34; B01J 38/02; B01J 38/56; B01J 38/60

[52] U.S. Cl. ................................ 502/27; 502/29; 502/31; 502/56

[58] Field of Search .................................. 502/22, 27, 29, 502/31, 56

[56] References Cited

U.S. PATENT DOCUMENTS 5,358,915 10/1994 Nebergall et al. ........................ 502/27
5,468,701 11/1995 Nebergall et al. ........................ 502/80

*Primary Examiner*—Michael Lewis
*Assistant Examiner*—Alexander G. Ghyka
*Attorney, Agent, or Firm*—Ronald C. Fish; HiTech Law

[57] ABSTRACT

A process for regenerating spent clay which includes: (1) an extraction stage wherein an organic solvent or mixture of organic solvents are thoroughly mixed with the spent clay thus separating the entrained oil from the spent clay, (2) a reactivation stage wherein the oil-free spent clay is treated with acid, and (3) a thermal polishing step wherein the acid-treated, solvent-extracted spent clay is heated at a high temperature from about 500 degrees F to about 1400 degrees F for approximately one minute to five hours, preferably 10 minutes to 4 hours.

24 Claims, 1 Drawing Sheet

PROCESS FOR REGENERATING SPENT CLAY

BACKGROUND OF THE INVENTION

The present invention relates in general to the process of reactivating spent clay. More particularly, the present invention relates to the process of reactivating spent clay used in the refining of oil or the re-refining of used motor oil or used vegetable oils.

In the refining and re-refining of used oil it is known that about 5 to 25% by weight of clay is used per weight of used oil. The used oil is typically re-refined using an acid-clay process. In this process, the clay is used to adsorb colored particles that keep the oil dark after it is subjected to the acidification step. The clay is also used to deodorize the oil. After use, the clay's color turns from its original white to a dark color. Further, the spent clay contains about 15% oil. The spent clay is considered toxic by the Environmental Protection Agency since the heavy metals in used oil are toxic. Any material containing more than 3% used oil is considered toxic and must be disposed of using expensive procedures. Since clay is also expensive and large amounts of it are used in the acid-clay re-refining process, it is desirable to recover the clay and re-activate it to a state where it is efficient in adsorbing carbonaceous materials and other particles that color oil and cause odors. This cuts down on the expense of clay purchase and reduces the cost and inconvenience of disposal of spent clay. This also reduces damage to the environment.

The usual method of disposing of spent clay is through landfill. However, since the spent clay still contains entrained oil in the amount of about 0.20 kg to about one (1) kg of oil per kilogram of dry spent clay, and said spent clay might ignite when disposed thereby. This possibility of fire poses an additional great danger to the environment and to the community in which the landfill is located over and above the possibility of pollution of ground waters from heavy metals in the entrained used oil leaching into the ground water.

Spent clay in order to be environmentally friendly must have an entrained oil of less than 3% by weight according to the regulations of the United States Environmental Protection Agency (EPA). Before this invention, that level of entrained oil was impossible to attain with the very best and most efficient separation method such as filtration or centrifugation.

In order to solve the problem of disposal of the spent clay, the best prior art solution offered to date has been to regenerate/reactivate and recycle the spent clay. The prior art discloses a number of methods to accomplish this. One method used to attempt to reactivate spent clay is solvent extraction. In this process, solvents such as toluene, xylene, benzene or other aromatic solvents, or ketones such as methyl ethyl ketone or acetone or aliphatic solvents such as hexane, heptane etc are mixed with the spent clay. The solvent extracts much of the entrained oil, but nobody really how how much of the carbon and pigment adsorbed colored particles are removed from the pores of the clay because these are not organic materials. The recovered clay from this process only has an efficiency in adsorbing colored particles of about 50% or less.

Another prior art process for reactivating spent clay is a heating method. In this method, the spent clay is heated above the cracking temperature of the entrained oil. This essentially boils off much of the entrained oil and essentially wastes this oil. It is unknown how much of the adsorbed particles such as carbon and pigments that this prior art method removes, and, in fact, the inventor believes this prior art method is ineffective in reactivating the clay because it turns much of the carbonaceous material entrained in the clay into coal or coke thereby failing to clear the pores of the clay and perhaps plugging up the pores even worse. Clay processed according to this process usually has an efficiency for adsorbing colored particles about the same as clay processed with solvent extraction only.

Another example of a prior art clay reactivation process is taught in U.S. Pat. No. 5,538,915. This patent teaches a four step process of (1) solvent extraction using about 250 cc of solvent per 10–15 grams of clay (2) oxidation by subjecting the clay to temperatures in the range of 80–90° C.; (3) acidification of the re-refined oil with hydrochloric or sulfuric acid; and (4) neutralization of the pH of the clay. This process has been found by experiments of the inventor to not work well or at all in reactivating the clay and lightening the color of the clay back to it virgin color and virgin adsorption efficiency.

To date none of the prior art processes has been proven to result in regenerated clay which may be re-used a high a number of times and having almost the same efficiency as virgin clay to lighten the color and deodorize re-refined oil from an acid-clay process. Thus, even after using the prior art methods, the spent clay still has to be disposed off in a landfill after only one or two reactivations because of the low efficiency of the re-activated clay.

SUMMARY OF THE INVENTION

The difficulties and drawbacks inherent in the prior art processes have been overcome by a process according to the teachings of the invention wherein spent clay is reactivated and utilized at least about 25 times, and after each reactivation, has almost the same efficiency or activity as virgin clay in lightening the color of and deodorizing re-refined oil.

The primary objective of the present invention is to provide a process for reactivating spent clay used in the refining of motor oil or vegetable oil or re-refining of used motor oil or used vegetable oils such as are used for deep frying foods. Clay is sometimes used in the refining of virgin petroleum based oils or base stocks and light ends such as kerosene, naptha, diesel, gas, etc. Clay is also sometimes used in the refining of petrochemicals such as di-octylphthalate, chloroparaffin, etc. Regardless of what process the clay was used in, a process within the genus of the invention can be used to reactivate the clay so that it can be reused many times and still be as effective or almost as effective as virgin clay.

Another objective is to provide for a process wherein the resultant reactivated clay has approximately the same activity or efficiency as virgin clay in adsorbing colored materials and deodorizing oil from a re-refining or other refining process.

Another object is to provide for a process which will remove the odor and lighten the dark color of the spent clay to almost the color and smell of virgin clay.

A process in the genus of the present invention comprises in general a solvent extraction stage to removed entrained oil, a reactivation stage to remove adsorbed materials from the pores of the clay and a thermal polishing stage to whiten the reactivated clay and remove additional contaminants not removed in the first two stages. All percentages and ratios to be given hereinafter are on a by weight basis unless otherwise specified.

DETAILED DESCRIPTION OF THE PREFERRED EMBODIMENT

Figure 1:
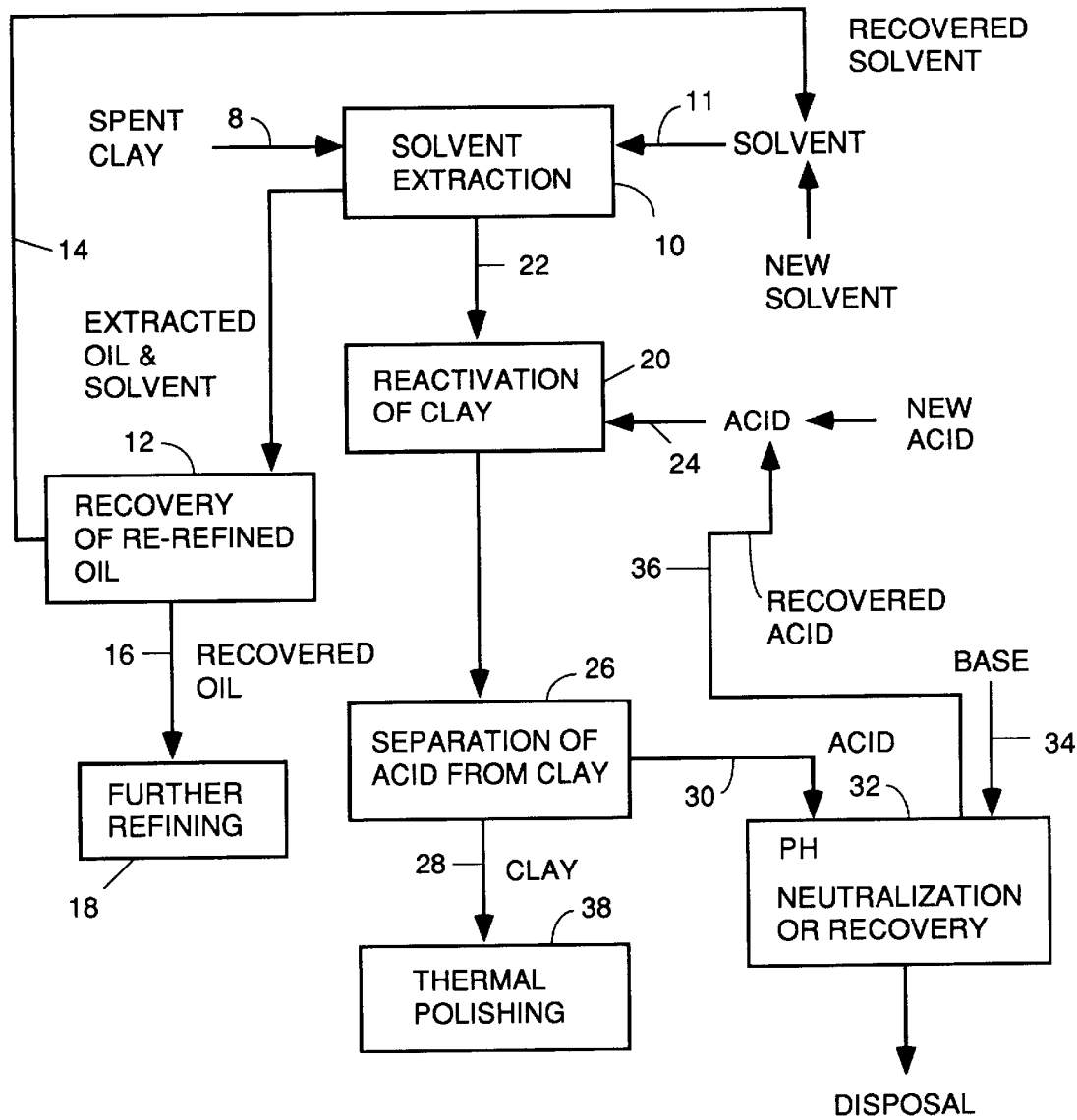
FIG. 1 is a block diagram of the general flow of a process according to the genus of the invention.

Referring to FIG. 1, there is shown a block diagram of a process flow according to the genus of the invention. Block 10 represents a solvent extraction step to remove as much entrained oil as possible from the spent clay 8. The spent clay 8 is typically clay that is used to re-refine used oil from the re-refining process described in U.S. Pat. 5,514,272 and 5,573,656, the contents of both which are hereby incorporated by reference. In the solvent extraction stage 10, the spent clay is thoroughly mixed with an organic solvent or mixture of organic solvents 11 in a clay/solvent weight ratio of about 1:1 to about 1:50, preferably about 1:2 to about 1:10. Typically, for every 10–15 grams of clay, 50–60 cc of solvent is used. The solvent used may be a polar solvent such as MEK or a nonpolar solvent such as toluene, and can be any ratio of such solvents. Preferably, a 50—50 blend of toluene and MEK is used. A solvent which is 100% polar or 100% nonpolar will also work. A 50—50 ratio works better, but not much better. The solvent-clay mixture is maintained for a period of about five seconds to about five hours, preferably about 3 minutes to about one hour at room temperature. Stirring of the mixture is preferred but not absolutely necessary.

This extraction step separates most of the oil from the spent clay. The solvent extraction step can be done at about room temperature or up to about the boiling point of the solvent. Organic solvents such as, but not limited to toluene, xylene, methyl ethyl ketone, benzene, trichloroethylene, petroleum distillates and the like can be used in the solvent extraction step 10.

The solvent and the extracted oil, i.e., the oil entrained in the spent clay is then separated from the spent clay by techniques known in the art such as decantation, filtration, centrifugation, etc., as symbolized by block 12. A vacuum filter is preferred because the solvent is flammable and it is undesirable to separate the oil and solvent from the clay in an open system where solvent vapors might accumulate since these processes are normally done in environments where there are motors and other spark generating machinery at work. The solvent is then recovered for reuse by evaporation and subsequent condensation in a closed system, and the recovered solvent is recycled for use on the next batch of clay, as symbolized by line 14. The recovered oil 16 retrieved from the solvent-oil separation process 12 can be then be processed further into high quality oil, as symbolized by block 18. The process described in U.S. Pat. No. 5,514,272 owned by the inventor of the process at bar can be used to further re-refine the recovered oil.

Next, the clay from which most of the oil has been removed is reactivated to clean out the pores of the clay particles, as symbolized by block 20. In the reactivation stage, the solvent-extracted spent clay 22 is treated with acid solution or mixture of acid solutions 24 having a concentration of about 0.1% to 100%, preferably about 0.5% to 33%. The solvent-extracted clay and acid at a weight ratio of about 1:1 to 1:50, preferably about 1:2 to 1:5 and thoroughly mixed for about five seconds to five hours, preferably about 3 minutes to about one hour, at room temperature, and the acid solution is separated through decantation, centrifuge, filtration, etc. Pure hydrochloric acid will work, but a diluted solution works best because then the reactivated clay does not have to be pH neutralized after the reactivation step. Any dilute acid solution that results in a reactivated clay having a pH which is within the range of the pH of virgin clay (typically between 4 and 7) is preferable so as to eliminate the step of neutralizing the reactivated clay before reuse. If high concentration acid is used, the reactivated clay should be neutralized in pH before reuse to avoid corrosion problems with the equipment in the plant which would otherwise result if the clay were not neutralized. The acid solution used by the inventor in his experiments was 3%–7% hydrochloric acid by weight in water which results in reactivated clay which has good adsorption characteristics and which does not have to be neutralized before reuse. The spent acid solution resulting from a 3%–7% hydrochloric acid will definitely have to be neutralized to the pH of water from (6 to 9 pH, preferably 7) before disposal however if disposal is chosen as opposed to recycling.

The reactivation stage can be done at about room temperature up to about the boiling temperature of water. Acids such as but not limited to hydrochloric acid, sulfuric acid and the like can be used.

Reactivated clay processed only with the first two steps of solvent extraction 10 and reactivation 20 only has gained back about 55%–60% of its virgin adsorption efficiency. The rest of the adsorption efficiency (98%–100% of virgin clay adsorption efficiency) is regained by the thermal polishing step described below.

The reactivated clay is then separated from the acid solution by sedimentation, filtration, centrifuge etc., as symbolized by block 26. Filtration works best because it is effective to yield a drier filter cake of reactivated clay 28.

The spent acid solution is then treated for reuse or pH neutralized, preferably to the pH of water for disposal by simple, inexpensive means such as dumping the neutralized solution in the sewer. The process of recovering the acid or neutralizing it for disposal is symbolized by block 32. Neutralization can be accomplished by mixing base 34 into the spent acid solution. Recovery of the acid is preferred since it reduces the cost of the process. Those skilled in the art know processes to recover spend dilute acid such as by reconcentrating it by boiling off the water content and filtering out particulates and blending the filtered acid with virgin concentrated acid for reuse. The resulting recovered acid is reused, as symbolized by line 36.

Next, the reactivated clay is subjected to thermal polishing step 38 to lighten its color back to the color of virgin clay and to remove any remaining contaminants. The thermal polishing stage is accomplished by heating the acid-treated, solvent-extracted spent clay at a temperature in the range of from about 500 degrees F to about 1400 degrees F for a residence time of approximately one minute to five hours, preferably about 10 minutes to about 4 hours. The minimum temperature for which experimental data has been collected is 500 degrees F, but 400 degrees F might also work, and the applicant does not wish to be limited to 500 degrees F. The claims should be interpreted such that the thermal polishing step means the clay is heated to any temperature which is high enough for the particular residence time used to bring its color back to a color and purity state which will cause re-refined oil processed with the recovered clay to emerge from the clay polishing step with a color that meets the desired color on the ASTM color scale. Any combination of temperature and residence time that will accomplish this desired end result, will suffice to practice the invention. Generally, higher temperatures yield whiter clay with fewer impurities and which is more effective in polishing re-refined oil to the desired color and odor-free state. Examples of time and temperatures combinations that have been found to be effective are: approximately 750 degrees F for approximately 2 hours residence time, and approximately 900 degrees F for approximately 30–45 minutes residence time.

After completion of the thermal polishing stage the resultant clay will possess adsorption and color qualities similar to virgin clay having regained about 98% to 100% of the adsorption efficiency of virgin clay. Spent clay can be recycled this way at least 25 times or more using the process described herein. The inventor is not sure what the upper limit is on the number of times the clay can be reactivated and it may be that the efficiency of the reactivated clay begins to fall slowly at some point after many reactivations, but experimental data is not currently available on that issue.

The process of the invention offers significant cost savings to acid-clay re-refining operations. Activated virgin clay is very expensive in that in the Phillipines, it costs about $350 to $450 per metric ton, and, in some countries, virgin activated clay costs $600–$700 per metric ton. Clay is used in the re-refining process of the patents incorporated by reference herein at a rate of 120 barrels of clay per 1000 barrels of input used oil. There are 1000 kilograms of clay per metric ton, and each barrel of clay weighs about 160 kilograms. This means that for a re-refining operation that processes 1000 barrels of input oil per month, approximately 19.2 metric tons of virgin clay would be consumed if the above described process of re-activating the clay were not used.

The largest users of activated clay are re-refiners of used vegetable oil of the type used in restaurants. The inventive process is also useful for reactivating spent clay from vegetable oil re-refining operations.

The reactivated clay is used to bleach the re-refined oil resulting from re-refining processes to lighten the color thereof. Use of the reactivated clay resulting from the inventive process produces oil having an odor and ASTM (American Society for Testing & Materials) color similar to the odor and color of re-refined oil when bleached with virgin clay.

Some of the advantages of spent clay reactivation are as follows:

1. Reactivation of spent clay eliminates the need for spent clay disposal which is very costly and difficult to achieve properly in compliance with strict environmental laws.
2. Additional income resulting from the recovery of entrained oil in the spent clay.
3. Reduction of virgin clay consumption and ensuing reduction in costs to re-refine used oil.
4. Contributes to a "Zero Waste" oil refining and re-refining process defined in the patents incorporated by reference herein by getting rid of the last undesirable byproduct (spent clay) and its disposal problem.

The present invention can be better understood by reference to the following examples which are presented to illustrate examples of process species within the genus of the invention and should not in any way be used to limit the scope of the present invention.

Example 1

The spent clay used in this example is spent clay resulting from the acid-clay re-refining of Mobil used mixed automotive crankcase oil.

The spent clay is subjected to the following reactivation steps:

a) Solvent Extraction Stage:

Five (5) kgs of spent clay is mixed with 15 kg of toluene. The clay/toluene mixture is mixed thoroughly for three minutes, after which toluene and the extracted lube oil is separated from the spent clay by vacuum filtration.

The solvent is evaporated and condensed for reuse while the recovered oil is further processed into high quality lube oil.

b) Reactivation Stage:

The solvent-extracted spent clay from step a) is then mixed thoroughly with 15 kgs of 1% concentration hydrochloric acid solution. After mixing thoroughly for 5 minutes the used hydrochloric acid solution is separated by decantation.

The spent hydrochloric acid is then stored for further treatment for reuse or can be neutralized for subsequent disposal.

c) Thermal Polishing:

The treated spent clay from step b) is heated to a temperature of from about 800 degrees F to about 900 degrees F for about 30 minutes residence time or until the resulting reactivated clay has regained its original color.

The residence time in the thermal polishing stage can be extended to about 2 hours.

The completed reactivated clay in Example 1 was thereafter used to bleach sludge-free oil generated from acid treatment of used oil. The reactivated clay was found to be as good as virgin or fresh clay, and yielded bleached oil having an ASTM color of between 3.0 to 3.5 with no odor.

The same spent clay was then reactivated again following the above procedure and the resulting reactivated clay exhibited the same quality and adsorption efficiency as virgin clay and yielded bleached oil having an ASTM color of between 3.0 to 3.5 with no odor.

Using the same procedure as in Example 1 but replacing the toluene with xylene, methyl ethyl ketone, benzene, trichloroethylene, petroleum distillates or mixtures thereof and adjusting the ratio of spent clay and solvent up to from 1:2 to 1:10 gave the same results for all practical purposes.

In the reactivation stage, the concentration of the acid solution was changed by increments from 1 to 33% and, instead of the hydrochloric acid solution, other acid solutions such as sulfuric acid and mixtures thereof were used in subsequent tests. Also the ratio of the spent clay and the acid was varied from 1:3 up to 1:10 and the resulting reactivated clay obtained was the same in terms of its efficiency.

Table 1 shows the comparison of the virgin clay and the reactivated clay using the process of the present invention.

TABLE 1

|  | Frequency of Reactivation | ASTM Color of Resulting Re-refined Oil | Color of Clay |
| --- | --- | --- | --- |
| Virgin Clay | 0 | 3.0–3.5 | Grayish white |
| Reactivated Clay | 1 | 3.0–3.5 | Grayish white |
|  | 2 | 3.0–3.5 | Grayish white |
|  | 3 | 3.0–3.5 | Grayish white |
|  | 4 | 3.0–3.5 | Grayish white |
|  | 5 | 3.0–3.5 | Grayish white |
|  | 10 | 3.0–3.5 | Grayish white |
|  | 15 | 3.0–3.5 | Grayish white |
|  | 20 | 3.0–3.5 | Grayish white |
|  | 25 | 3.0–3.5 | Grayish white |

Example 2

200 grams of clay was mixed with 600 grams of toluene and MEK in a 50—50 ratio of toluene to MEK. The resulting slurry was mixed at room temperature for 10–30 minutes. The clay was then separated from the solvent and oil by vacuum filtration. The clay was then heated to dehydrate it, and the solvent/oil mixture was heated to evaporate the solvent. The solvent was condensed and reused. The oil was re-refined using the acid-clay re-refining process of the patents incorporated herein by reference.

The dehydrated clay was then reactivated by mixing it with a 3% hydrochloric acid solution in a 1:3 ratio of clay to acid solution (600 grams of acid solution was used). The slurry was mixed for from 10–60 minutes at room temperature, but any temperature below the boiling point of water could have been used. The higher temperatures speed up the reaction, but requires more exotic acid resistant vessels and plumbing and other equipment. The resulting slurry was then pH neutralized to the pH of virgin clay (6 to 9) before separation of the liquid from the solid phase by filtration. The liquid phase was then disposed of after further neutralization if necessary to reach a pH of 7.

The filtered clay was then thermally polished at a temperature of 900 degrees F for a residence time of 30 minutes until the reactivated clay reached a creamy ivory color and had from about 95% to 100% of the adsorption efficiency of virgin clay.

What is claimed is:

1. A process of reactivating spent clay having entrained therein used motor oil having organic, inorganic and/or metallic impurities or other used edible or inedible oil therein, comprising:

1) exposing spent clay from an oil re-refining process to a polar or nonpolar solvent or a mixture of polar and nonpolar solvents capable of extracting the particular type of oil entrained in said spent clay, said exposure being for a time sufficient to extract most of the entrained oil as possible from said spent clay;

2) separating the solvent and oil from said spent clay;

3) reactivating clay resulting from step 2) by exposing said clay to acid solution for a predetermined interval using an acid diluted in another solvent such as water, said acid being of a type which is suitable to attack enough of the inorganic and organic impurities present in the entrained oil so as to break them down into smaller molecules that can be removed by said solvent or convert them into a different compound that can be removed by said solvent or otherwise remove at least some of said organic and inorganic and metallic impurities, said acid having a concentration in said solvent which is strong enough and exposure interval being long enough to remove enough adsorbed organic, inorganic and metallic impurities from said clay to increase the adsorption efficiency of said clay to approximately 55% to 60% or more of the adsorption efficiency of virgin clay; and 4) separating the clay from said acid solution;

5) thermally polishing the clay resulting from step 4) to lighten the color thereof by heating the clay resulting from step 4) in an open or closed container with the clay being regenerated without exposing the clay being regenerated to pure oxygen and wherein the container does not have to be a pressure vessel and does not have to be airtight, said thermal polishing being at a temperature which is high enough and for a time which is long enough such that the clay resulting from step 4) has an adsorption efficiency sufficiently high to allow regeneration of the clay at least 25 times with no significant loss of adsorption efficiency of the regenerated clay relative to the adsorption efficiency of virgin clay and sufficiently high to make the reactivation process economical relative to the cost of using fresh clay for every batch in a batchwise used-oil re-refining process considering the equipment, solvents, acids and residence time used in the regeneration process, and wherein said temperature and residence times are selected to be high enough and long enough to bleach the clay being regenerated to the desired color on the ASTM color scale.

2. The process of claim 1 wherein said thermally polishing step is carried out at a temperature and for a time sufficient to return the clay resulting from step 4) to approximately the same color as virgin activated clay and to an adsorption efficiency of 98% or higher of virgin clay.

3. The process of claim 1 wherein said step of separating the solvent and oil from said spent clay is carried out by vacuum filtration.

4. The process of claim 1 wherein the solvent and oil separated in step 2) are further processed by boiling off the solvent and re-condensing it for re-use in step 1) of another batch of spent clay.

5. The process of claim 1 wherein the solvent and oil separated in step 2) are further processed by removing the solvent from the solvent oil mixture and re-refining the remaining oil using an acid-clay re-refining process.

6. The process of claim 1 wherein the step of thermally polishing the clay comprises heating the clay to a temperature in a range from approximately 500 degrees F to 1400 degrees F for a residence time which is long enough to restore the adsorption efficient of the reactivated clay to a level wherein used oil after having been subjected to the acid treatment steps of an acid clay re-refining process can be bleached by the reactivated clay and emerge with an acceptable odor and a color from 3.0 to 3.5 on the ASTM scale.

7. The process of claim 1 wherein the acid solution resulting from step 4) is reused.

8. The process of claim 1 wherein the ratio of solvent to spent clay is about 50–60 cc of solvent for every 10–15 grams of spent clay.

9. The process of claim 1 wherein the ratio of solvent to spent clay is from about 1:1 clay:solvent to about 1:50 clay:solvent.

10. The process of claim 1 wherein the solvent used is either toluene or MEK or a combination of both in any ratio, preferably a 50—50 ratio.

11. The process of claim 1 wherein the acid solution used in step 3) is 0.1% to 100% concentration by weight hydrochloric acid in water.

12. The process of claim 1 wherein the acid solution used in step 3) is about 3% to about 7% concentration by weight hydrochloric acid in water and the exposure time to the acid is from five second to five hours at any temperature from about room temperature up to just below the boiling point of water.

13. The process of claim 12 wherein said thermal polishing step comprises exposing the clay to a temperature of from about 500 degrees F to about 1400 degrees F for a residence time of from about one minute to five hours.

14. A process of reactivating spent clay which comprises the steps of:

a) extracting oil entrained in spent clay using an organic solvent or mixture of organic solvents in a weight ratio of about 1:1 to about 1:50 for about five seconds to about five hours and at about room temperature up to about the boiling point of the organic solvent or mixture of organic solvents;

b) separating the solvent and the oil from the spent clay;

c) treating the solvent-extracted spent clay with acid or mixtures of acids having a concentration of about 0.1% to 100% at a weight ratio of about 1:1 to 1:50 for a period of about five seconds to five hours and at a temperature of about room temperature up to about the boiling point of water;

d) separating the acid and the solvent-extracted spent clay; and e) heating the acid-treated, solvent-extracted spent clay at a temperature of from about 500 degrees F. to 1400 degrees F. for a period of about one minute to five hours.

15. The process of claim 14 wherein the organic solvent is selected from the group consisting of toluene, xylene, methyl ethyl ketone, benzene, trichloroethylene, petroleum distillates and the like, and wherein the clay to solvent ratio is in the range from 1:2 to 1:10 and the solvent can be a mixture of solvents at any ratio including polor and nonpolar solvent mixes at any ratio.

16. The process of claim 14 wherein the acid is selected from the group consisting of hydrochloric acid, or sulfuric acid, and has a concentration of from 0.5% to 33%, and wherein the mixture of clay to acid has a weight ratio of from 1:1 to 1:50, and wherein the step of separating the solvent and the oil from the spent clay is done using a vacuum filtration step.

17. The process of claim 15 wherein the organic solvent is toluene.

18. The process of claim 16 wherein the acid is hydrochloric acid with a concentration of from 3% to 7% and a clay to acid weight ratio of from 1:2 to 1:5, and the solvent is a 50—50 mix of toluene and MEK, and wherein the step of separating the clay from the acid solution is by filtration and wherein said temperature and residence time are between about 750 degrees F. for 2 hours up to about 900 degrees F. for 30–45 minutes residence time.

19. The process of claim 14 wherein the spent clay to solvent weight ratio is from about 1:2 to about 1:10.

20. The process of claim 14 wherein the extraction step is from about 3 minutes to one hour.

21. The process of claim 14 wherein the concentration of the acid solution is about 0.5% to 33%.

22. The process of claim 14 wherein the weight ratio of the solvent-extracted spent clay to acid solution is from about 1:2 to about 1:5.

23. The process of claim 14 wherein the reactivation stage is from about 3 minutes to about one hour.

24. The process of claim 14 wherein the thermal polishing stage is from 10 minutes to 4 hours.

* * * * *